Sept. 23 1930.  G. A. COUNTRYMAN  1,776,579
BRAKE SETTING TOOL
Filed Feb. 17, 1928
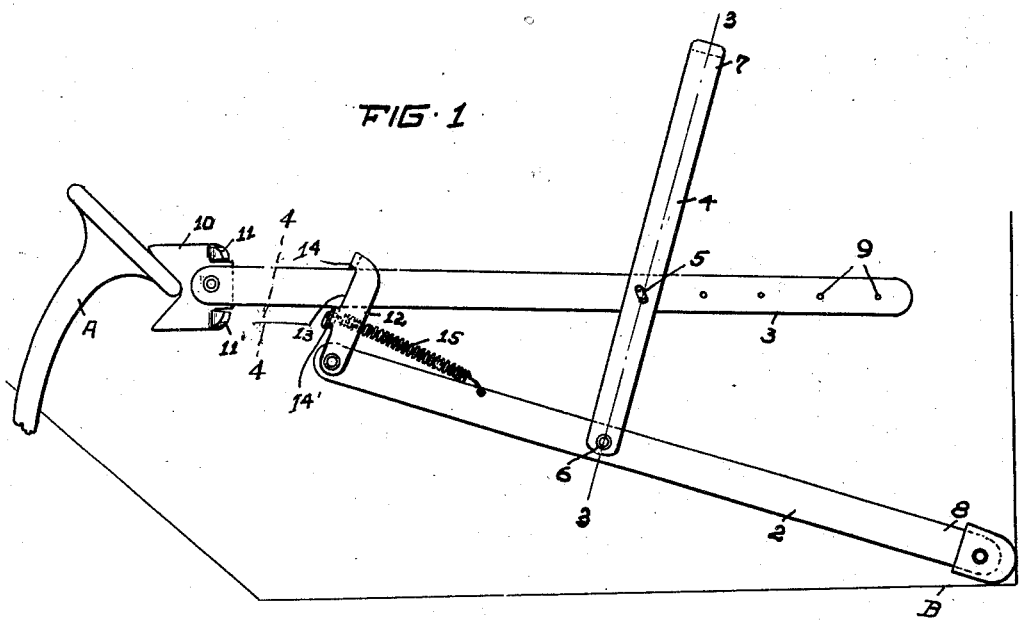
FIG. 1
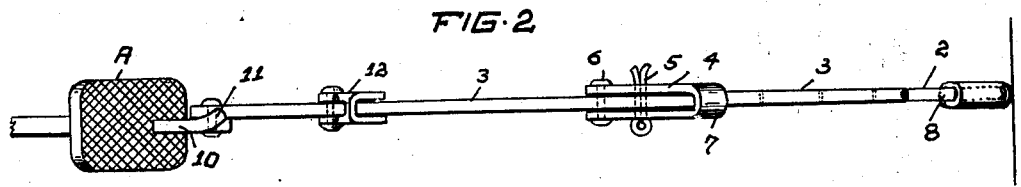
FIG. 2
FIG. 3  FIG. 4  FIG. 5
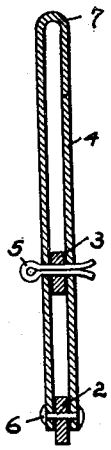 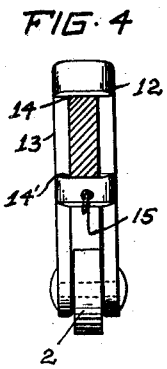 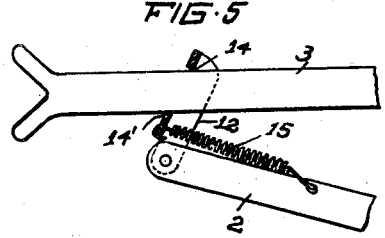
Inventor
GUY A. COUNTRYMAN
By Fisher, Moser & Moore, Attorney Patented Sept. 23, 1930

1,776,579

UNITED STATES PATENT OFFICE

GUY A. COUNTRYMAN, OF ASHLAND, OHIO, ASSIGNOR, BY MESNE ASSIGNMENTS, TO ELITE MANUFACTURING COMPANY, A CORPORATION OF OHIO

BRAKE-SETTING TOOL

Application filed February 17, 1928. Serial No. 255,011.

The present invention relates to brake setting tools, and more particularly to a tool for depressing and holding the brake pedal of an automobile in a desirable predetermined position to facilitate adjustments and settings of the brake mechanism of whatever kind or make the vehicle may be equipped with. The tool is made simply and inexpensively and as constructed it may be conveniently adjusted and operated so that it may be fixed in a braced position between the front seat and a pedal in any vehicle or car regardless of its make and dimensions.

In the accompanying drawings, Fig. 1 is a side view of the tool in an operating position in an automobile; Fig. 2 a top view of the tool itself; and Figs. 3 and 4 sectional views on lines 3—3 and 4—4, respectively, of Fig. 2. Fig. 5 is a sectional view of the friction clutch.

The tool consists of a base bar 2 and a reach member or bar 3 linked together by a lever 4 in the form of a doubled bar or strap, the respective legs of which serve to enclose and hold bar 3 against twisting movements. Bar 3 is pivotally secured to both legs of lever 4 by a removable pin 5, and the lower extremities of the legs of lever 4 are pivotally connected by a rivet 6 to the middle part of base bar 2. The upper end 7 of this strap where doubled back on rounded lines provides a handle which may be gripped and operated to press the reach bar 3 forward toward a brake pedal A when the outer leather covered end 8 of base bar 2 is placed in contact with the base board B of the seat of the vehicle. The distance between the pedal and the seat varies in different makes of vehicles, and reach bar 3 is therefore provided with a plural number of openings 9 to receive the connecting pin 5 and permit bar 3 to be extended or carried forward relatively to the handle bar or lever 4, thus increasing the reach of the tool. Reach bar 3 is a plain flat bar with straight edges and the front end thereof is provided with an engaging member 10 for the pedal, which member is in the form of a flat plate pivotally mounted upon the bar and having a V-shaped notch to receive the pedal. The turning movement of plate 10 on its pivot in opposite directions is limited by a pair of lips or lugs 11—11' which are integral parts of the plate bent laterally so as to overlap the straight edges of bar 3.

Reach bar 3 may be shifted freely in a forward direction toward the pedal, but its movement reversely or in the opposite direction is constantly checked by a friction clutch member 12 attached to the front end of base bar 2. Clutch member 12 is made of a flat piece of metal bent into U-shape, and the back or connecting part 13 of this piece is formed with an opening slightly longer than the width of bar 3 so that bar 3 may move freely through the opening in one direction, but when this member is inclined relatively to bar 2 the bar will be clutched tightly by and between the straight edges 14—14' in the back 13. A coiled tension spring 15 connects the tilting member or slip clutch 12 with base bar 2 so that it is held normally in a rearwardly inclined locking position on the bar. Accordingly when the reach bar is pressed longitudinally toward the seat by the pedal, which pedal it should be understood is pressed constantly in the direction of the seat by a strong spring, the clutch member locks the reach bar to the base bar and holds the pedal in the position to which it has been moved previously by the throw of lever 4. To release the pedal the operator presses the pivoted clutch member forward with one hand while manipulating lever 4 with the other hand. The clutch member is relatively short, and lever 4 relatively long, and bar 3 is pivotally connected to lever 4 remotely from base bar 2 so that the reach bar is inclined relatively to the base bar. However when the tool is braced against the seat the reach bar is horizontal or approximately so, whereas the base bar is inclined relatively to the floor of the car.

What I claim is:

1. A brake setting tool, comprising a base bar, a reach bar, a lever linked to said bars, and a friction slip clutch for said reach bar pivotally connected with said base bar.

2. A brake setting tool, comprising a base bar having a lever hinged thereto, a reach bar having a series of openings therein, a pin to fasten said lever to said bar at any one elected opening, and a friction clutch for said reach bar pivotally secured to one end of said base bar.

3. A brake setting tool, comprising a base bar, a double bar hinged astride said base bar a reach bar extending through said double bar and pivotally connected therewith, and a clutch member pivotally attached to said base bar and straddling said reach bar.

4. A brake setting tool, comprising a base bar, a lever made of a bar doubled to provide parallel legs engageable with the opposite sides of said base bar and hinged thereto, a clutch member pivotally connected to said base bar, a reach bar extending between the legs of said lever, means pivotally connecting said reach bar to said lever, and a spring holding said clutch member in engagement with said reach bar.

5. A brake setting tool, comprising a base bar having a lever hinged thereto, a reach bar adjustably connected to said lever, a relatively short clutch member pivotally connected to said base bar having an opening therein for the reach bar, and a tension spring to hold said clutch member normally in inclined clutching connection with said reach bar.

In testimony whereof I affix my signature.

GUY A. COUNTRYMAN.